Figure 1:
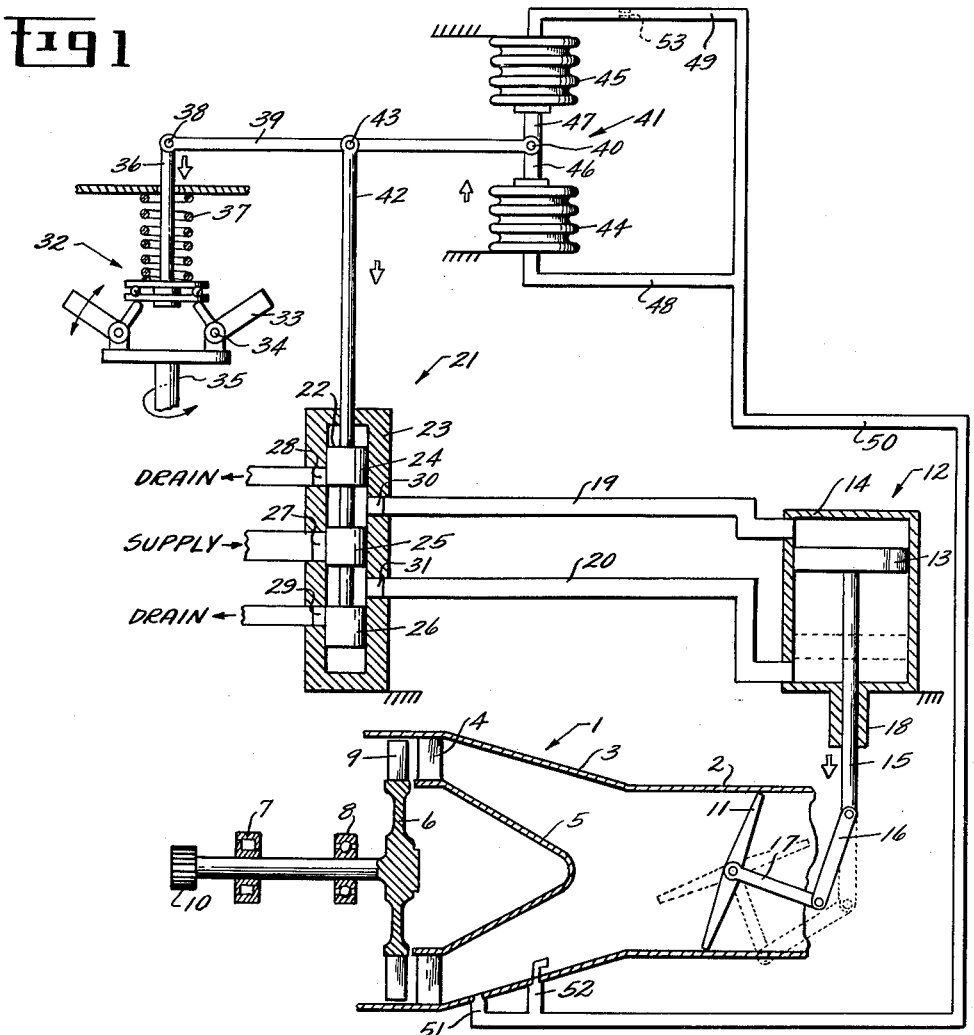

Oct. 23, 1962 P. DANTOWITZ 3,059,660
TURBINE CONTROL SYSTEM
Filed Oct. 8, 1958

INVENTOR.
PHILIP DANTOWITZ
BY
Lawrence G. Norris
ATTORNEY—

United States Patent Office 3,059,660
Patented Oct. 23, 1962

3,059,660
TURBINE CONTROL SYSTEM
Philip Dantowitz, Peabody, Mass., assignor to General Electric Company, a corporation of New York
Filed Oct. 8, 1958, Ser. No. 766,052
7 Claims. (Cl. 137—29)

My invention relates to fluid turbines and in particular to control systems for such turbines.

In the control of fluid turbines, such as, for instance, air turbines driven from compressed air extracted from a jet engine compressor, it is usually necessary to provide some form of stabilization signal in the control in order to prevent unwanted sustained oscillations in the system. Consider, for instance, the speed control loop of an air turbine driving an aircraft accessory, such as an electrical generator, and deriving its power from compressed air extracted from the compressor of a jet engine. In such a system, it is a common practice to control the speed of the turbine by means of a throttle valve situated in the inlet ducting leading to the turbine.

The position of the throttle valve, which determines the pressure at the turbine inlet, is commonly controlled by a speed governor. The governor provides a speed reference which establishes the preselected speed at which the turbine is to operate. When the speed exceeds the preselected level, the governor provides a signal to the throttle valve causing it to move toward the closed position, thus reducing the inlet pressure, and hence the flow, to the turbine to reduce its speed. Similarly, when the speed of the turbine falls below the preselected level, the governor provides a signal to the throttle valve causing it to open and increase the speed of the turbine.

It will be appreciated, however, that there usually are at least two significant time delays involved in the sequence of events that must occur in order to restore the turbine to the preselected speed after a speed error has been detected. The first of these occurs in moving the valve to the new position called for by the governor and the second is caused by the inertia of the turbine, which produces a time delay in the return of the turbine to the reference speed after the new pressure and flow conditions to the turbine have been established.

As will be hereinafter explained, the existence of time lags in the control loop can cause sustained oscillations in the speed of the turbine, these oscillations in some cases reaching such a magnitude as to cause mechanical failure of the system.

For purposes of explanation, assume that the load on the turbine is suddenly increased, thus causing an imbalance between the load torque and the torque available from the turbine. Because the torque delivered by the turbine is less than what is required, the speed of the turbine beings to decrease. As the speed decreases, a speed error signal is produced by the governor in a direction calling for the throttle valve to move toward the open position. Because of the time lag, however, throttle valve position will always lag behind the speed error signal.

As the throttle valve moves toward the open position, an increased torque is applied to the turbine and the rate at which speed error is increasing begins to decrease. Here again, however, the turbine speed lags behind the applied torque because of the inertia of the turbine and its load. As the throttle valve continues to open, eventually the valve will reach a point where the torque applied to the turbine is sufficient to supply the new load requirement. However, the turbine speed will not begin to increase until the torque developed by the turbine exceeds this level and the throttle valve will therefore continue to open as long as the turbine speed is less than the reference level.

Therefore, at the point where the turbine again attains the reference speed, the torque applied by the turbine will be more than required and the speed will overshoot the desired level, thus causing a speed error in the opposite direction. Depending on the magnitudes of the time lags in the control loop, the foregoing sequence can develop into a series of overshoots, with each cycle having an overshoot of increased magnitude over the next preceding one. If this condition occurs, the control system can be described as being unstable and the resulting cyclic swings of the system are commonly referred to as sustained oscillations. These oscillations normally build up in magnitude until either saturation occurs, at which point the system will continue to oscillate at a fixed amplitude, or until failure of one or more elements in the control loop causes a failure of the control system.

Various methods for stabilizing control systems of the foregoing type are well known in the art. It is an object of my invention to provide a control system of the foregoing type having an improved stabilization arrangement.

It is another object of my invention to provide a control system for fluid turbines in which the control stabilization arrangement is simple and inexpensive.

Briefly stated, I accomplish this and other objects by providing means for sensing variations in the fluid inlet pressure at the turbine to derive a signal proportional to the magnitude of such inlet pressure variations. The pressure signal is then subtracted from the speed error signal so that the net corrective signal available is the difference between the magnitudes of the speed error and inlet pressure signals. Thus, a signal is inserted in the control loop which, in effect, anticipates a speed change on the part of the turbine to reduce the effects of time lags in the control loop and thereby stabilize the system. The pressure responsive signal is the sole stabilizing signal in the system. In one form of my invention, I provide means for "washing out" the pressure signal in the steady state. As will be hereinafter explained, my invention provides certain advantages over other forms of turbine control loop stabilization, such as inlet valve position sensing, a technique presently well known in the art.

Various other objects and advantages of my invention will be set forth in the following description, taken in connection with the accompanying drawings, and the scope of my invention will be defined in the appended claims.

Figure 2:
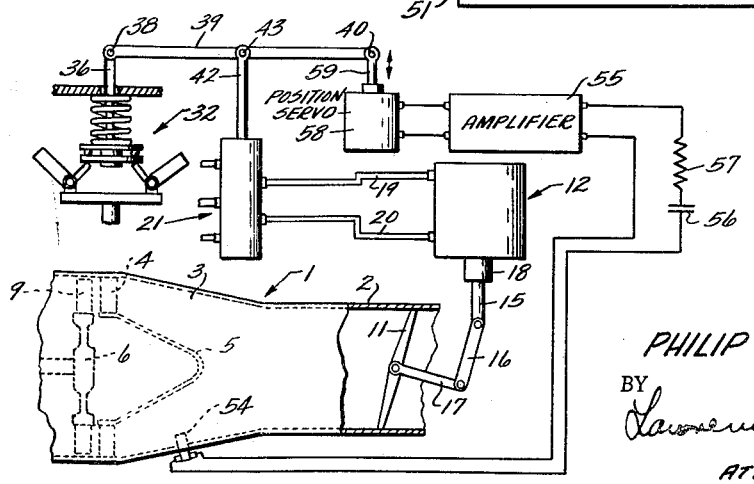

Referring to the drawings:

FIG. 1 is a schematic presentation of a turbine speed control system embodying my invention; and, FIG. 2 is a schematic illustration of an alternate mechanization of the system shown in FIG. 1.

Referring to FIG. 1, there is shown a turbine unit 1 of a type commonly employed as auxiliary drives in aircraft. The turbine derives its power from compressed air extracted from the compressor of a jet engine (not shown) and delivered to the turbine through an inlet duct 2. Compressed air is delivered to the turbine through an inlet casing 3, which is provided with a series of inlet nozzle partitions 4 and a conically shaped guide member 5 for directing the air to the inlet nozzle partitions.

The turbine 6 is rotatably mounted in a pair of bearings 7 and 8 and is provided with a series of buckets or blades 9. Compressed air is directed from the nozzle partitions 4 against the blades 9 to produce a driving torque on the turbine. The driving torque is transmitted to the load either directly or through suitable gearing engaged by an output pinion 10.

The pressure at the inlet to the turbine, and hence, the flow to the turbine, is controlled by means of a throttle valve 11, which is rotatably mounted in the inlet ducting upstream of the nozzles 4. Thus, the speed of the turbine 6 may be regulated by controlling the position of the valve 11. It will be appreciated that the pressure at the turbine inlet may be controlled in various other ways, such as by means of poppet valves or the like commonly used with steam turbines, and that I have illustrated the throttle valve 11 merely as being one of a number of arrangements capable of being used to regulate the inlet pressure, and hence the speed, of a fluid turbine.

The position of the valve 11 is regulated by an actuator 12, which comprises a piston 13 slidably mounted in a cylinder 14 and having an output shaft 15 connected through linkage members 16 and 17 to the shaft of the valve 11. The actuator 12 is rigidly mounted on the turbine structure and the output shaft 15 is provided with suitable guide means such as a sleeve 18. The intermediate linkage element 16 is articulated at both ends and the element 17 is rigidly secured to the shaft of the valve 11 such that longitudinal movement of the piston 13 causes rotative movement of the valve 11. With the elements positioned as shown in the solid lines, the valve is in the closed position and with the elements positioned as shown in the dotted lines, the valve is in the full open position, the actuator being capable of positioning the valve 11 in any intermediate position to provide the desired pressure of the turbine inlet.

The piston 13 may be caused to move in either direction by porting fluid, in this case hydraulic fluid, to one side of the piston or the other through hydraulic lines 19 and 20. The porting of hydraulic fluid is accomplished by means of a pilot valve 21 to which the lines 19 and 20 are connected as shown. The pilot valve 21 includes a spool 22 slidably mounted in a block 23 and having three lands or piston portions 24, 25 and 26 on it. The spool 22 may be moved longitudinally to control fluid communication between ports 27, 28, 29, 30 and 31 as will be hereinafter described. Port 27 is connected to a source of hydraulic fluid under pressure while ports 28 and 29 are connected to a sump or drain. Ports 30 and 31 are connected to the lines 19 and 20 as shown.

The spool 22 is shown in the lapped position; that is, with the supply 27 and the drain ports 28 and 29 closed off from fluid communication with the ports 30 and 31.

Movement of the spool 22 in the downward direction establishes communication between supply port 27 and the port 30, causing fluid under pressure to flow to the upper side of piston 13. At the same time, communication is established between port 31 and drain port 29, allowing fluid to be discharged from the underside of the piston through line 20 to the system drain. Thus, downward movement of the spool 22 causes downward movement of the piston 13, moving the valve 11 toward the full open position. Movement of spool 22 in the upward direction from the lapped position connects supply port 27 through port 31 and line 20 to the underside of the piston 13 and, at the same time, connects the upper side of the piston through line 19, port 30 and port 28 to the system drain, thus causing upward movement of the piston 13, moving the valve 11 toward the closed position.

The speed of the turbine is sensed by a speed governor 32 having flyweights 33 which are pivotally mounted at 34 and are driven by an input shaft 35, which is connected to be driven by the turbine. The force generated by the flyweights is applied to a plunger 36 which is spring loaded by means of a reference spring 37, the position of the plunger 36 thus being a function of the speed of the turbine 6. The plunger 36 is pivotally conected by means of a pin 38 to linkage element 39.

The linkage element 39 is pivotally attached at its opposite end by means of a pin 40 to a differential bellows system 41, and is attached intermediate its ends to an actuating link 42 by means of a pin 43. The link 42 is in turn connected to the spool 22 of the pilot valve 21.

The differential bellows 41 includes a pair of bellows elements 44 and 45 connected through output rods 46 and 47 and pin 40 to the linkage element 39. The bellows elements 44 and 45 are connected through fluid conduit lines 48, 49 and 50 to one or more pressure taps 51 and 52, which are mounted in a position so as to respond to the magnitude of the fluid pressure at the turbine inlet. In the embodiment illustrated, the pressure taps 51 and 52 are mounted in the turbine inlet casing 3 but it is to be understood that the pressure sensing means may be located at any point downstream of the pressure control valve 11 and upstream of the turbine. The pressure tap 51 is shown as a static pressure probe while the tap 52 is shown as a total pressure probe. I have found that either type of tap, or a combination of both types, will provide a satisfactory signal for stabilization purposes, as will be later explained.

The conduit 49 is provided with a fluid restriction, such as an orifice 53, to reduce the rate at which fluid may flow through conduit 49 relative to conduit 48. The forces generated by bellows elements 44 and 45 are, however, equal and opposite so that the pin 40 is always returned to the same position in the steady state once the time delay introduced by the orifice 53 has elapsed.

By way of example, assume that the pressure in the inlet casing 3 is rapidly increased to a higher level by movement of the valve 11 toward the open position. The increased pressure will be immediately transmitted through conduits 50 and 48 to bellows 44 causing an increase in the upward force generated by that element. However, because of the time delay introduced in conduit 49 by the orifice 53, the pressure in bellows 45 will not be immediately correspondingly increased. The resulting force unbalance will therefore cause movement of the pin 40, and the end of the element 39 to which the pin 40 is attached, in the upward direction. Then, as the pressure builds up in bellows 45, the force balance between the bellows 44 and 45 will again be restored and the pin 40 will be returned to its original position by the resilient spring forces of the bellows elements.

The operation of the foregoing system will now be described.

It will be observed that the speed of the turbine is controlled by a primary loop comprising the speed governor 32, the pilot valve 21, the actuator 12 and the pressure control valve 11. Stabilization is provided by feeding back a signal which is a function of the magnitude of the inlet pressure to the turbine. In the embodiment shown, this is accomplished through the differential bellows 41, the pressure feedback signal being subtracted from the speed error signal during system transients through the linkage element 39.

For purposes of explaining the operation of the system assume that the load on the turbine is suddenly increased, thus causing the turbine speed to begin to decrease. This causes the force generated by the flyweights 33 to decrease and the rod 36 is therefore moved downwardly in the direction of the arrow by spring 37 until a new force balance position is achieved.

Since the pilot valve spool 22 will move upon the application of only a slight force, movement of the rod 36 causes pivotal movement of the linkage element 39 about the pin 40 and thus, for the condition assumed above, will cause downward movement of the link 42 and the spool 22. As hereinbefore explained, downward movement of spool 22 connects the upper side of cylinder 14 to the hydraulic fluid supply and connects the lower side of cylinder 14 to the system drain, thus causing downward movement of the piston 13 in the direction of the arrow. Downward movement of the piston 13, acting through linkage elements 16 and 17, moves the valve 11 toward the open position, thus increasing the fluid pressure at the turbine inlet. Without some form of stabilization, the control loop would have a tendency to oscillate in the manner already set forth. However, as will now be described, the pressure feedback arrangement overcomes this tendency.

To continue the foregoing example, as the pressure in the inlet casing 3 increases, the force generated by bellows 44 will be increased, by reason of the increased pressure therein, while the force generated by bellows 45 will initially remain at a lower level by reason of the time delay in pressure build-up to that element caused by the orifice 53. Thus, the bellows 44 will initially move the pin 40 in the upward direction as indicated by the arrow. Since the position of the pin 38 is maintained by the speed governor, the link 39 will be pivoted about pin 38 with respect to movements of the pin 40. Thus, an upward movement of pin 40 causes upward movement of the link 42 and pilot valve spool 22, thus subtracting from the downward movement of the spool 22 caused by the speed error signal generated by the governor 32.

Thus, in effect, a speed error signal opposite in direction to that sensed by the governor is introduced into the control loop in anticipation of a speed increase and probable overshoot in the speed of the turbine which will later occur as a result of the opening of the valve 11. The control is therefore provided with a corrective signal which is advanced in time ahead of the event for which the correction is to be made. Thus, as the turbine speed increases toward the reference level, the control is provided with a signal equivalent to that which would occur as a result of a speed overshoot except that the signal is made available in advance of the actual occurrence of the overshoot. By anticipating the cyclic swings in the system and providing corrective signals in advance of their occurrence, the effect of the time lags in the control loop can be greatly reduced, thus permitting stable operation of the system.

Once the transient has expired and the system has returned to a steady state condition, the pressure feedback signal is "washed out" by the relatively slow resetting action of the bellows 45. It will be recognized, however, that from a stabilization standpoint, it is unnecessary to wash-out the pressure feedback signal, the only effect of allowing it to remain being that the governor 32 must seek a new reference speed in order to move the pilot valve spool 22 back to the null position. Thus, the same degree of stabilization may be provided by eliminating the reset bellows 44 and allowing the steady state speed of the system to "droop" with increasing turbine inlet pressure.

It will be apparent from the foregoing, therefore, that the primary control loop may be stabilized by utilizing turbine inlet pressure feedback and that this concept may be applied with equal facility to a "droop" type system, i.e., one where the steady state speed is allowed to decrease with increasing turbine inlet pressure, and to an "isochronous" type system, i.e., one where the feedback signal is washed out in the steady state to permit the system to return in each case to the same reference speed.

Referring now to FIG. 2, I have shown an alternative embodiment of my invention wherein the pressure feedback is accomplished through electrical means. In this case, I have illustrated the speed governor 32, the pilot valve 21, the turbine 1 and its inlet valve 11, these elements, as well as the remaining elements of the primary speed control loop being the same as shown in FIG. 1. I have also shown the interconnecting linkage elements 36, 39 and 42 together with the pin connections 38, 40 and 43.

In this embodiment, turbine inlet pressure is sensed by a pressure transducer which provides an electrical output signal proportional to turbine inlet pressure. The electrical output signal of the transducer 54 is introduced to an electrical amplifier 55 through a series connected capacitor 56 and resistor 57. The amplified pressure signal is then applied to a position servo 58, which may conveniently take the form of a force motor operating against a reference spring, to achieve a position output of an output link 59 which is proportional to the magnitude of the input signal to the position servo. The pressure feedback signal operates on the link 39 in the same manner as the signal introduced by the bellows element 41, as previously described in connection with the embodiment of FIG. 1 except that in the embodiment of FIG. 2, steady state wash-out of the pressure feedback signal is provided by the capacitor 56 which passes only transient signals and is effectively an open circuit to the steady state output of the transducer 54. The value of the resistor 57 is selected relative to the value of the capacitance of the capacitor 56 to provide the desired time constant for the wash-out action. Here again, the capacitor and resistor wash-out may be eliminated without affecting stabilization if a droop system is desired.

The utilization of turbine inlet pressure for stabilization purposes provides certain advantages over other techniques such as valve position feedback, which is presently quite commonly employed. These advantages are particularly significant in cases where the turbine must operate over a wide range of supply pressures, a situation commonly encountered in aircraft applications where the supply pressure is derived from a jet engine compressor which because of variations in engine power and altitude must operate over a wide range of discharge pressures. It will be appreciated that, in such a case, the amount of acceleration or deceleration torque delivered to the turbine per increment of angular movement of the inlet valve means also varies over a correspondingly wide range. In other words, at very low supply pressures, the inlet pressure to the turbine may change by only 1 or 2 pounds per square inch for an inlet valve movement of 5° or so, whereas, at maximum supply pressures, the same 5° movement of the inlet valve may produce a turbine inlet pressure change of 20 to 30 pounds per square inch.

However, if inlet valve position is sensed in order to obtain a signal anticipating turbine speed changes for stabilization purposes, the same magnitude of signal will be derived for a given incremental movement of the valve regardless of whether this movement produces a very large or a very small change in the acceleration or deceleration torque delivered to the turbine. However, in a system employing my invention, where the turbine inlet pressure itself is sensed, a signal is obtained which is more nearly directly proportional to the acceleration or deceleration torque delivered to the turbine, and thus more accurate in anticipating the magnitude of the turbine speed change which is to occur as a result. As used herein, the terms "speed error signal" and "speed corrective signal" means the signal produced at the speed governor itself and not the signal eventually delivered to the turbine flow control valve through the dynamics of the force amplifying servo system. By subtracting the pressure feedback signal directly from the speed error signal, I enclose in the feedback loop the dynamics of the system between the point where the speed error signal is generated and the point where the fluid pressure, which itself may be proportional to the speed error signal, is ultimately delivered to the turbine. In other words, I enclose in the feedback loop the various time lags between the speed error signal and the fluid pressure which ultimately is produced by that signal.

It will be apparent from the examples given above that the pressure feedback signal may be introduced in a number of different ways. I have shown one arrangement wherein this is accomplished by mechanical means and a second arrangement wherein the elements are primarily electrical in character. Various other arrangements will occur to those skilled in the art.

It will also be apparent that my invention is applicable to primary control loops which are of configurations different from the particular one shown and described. For instance, it will be apparent that the speed of the turbine may be sensed electrically and that in such a case it might be found convenient to subtract the pressure feedback signal from the speed error signal electrically rather than through a mechanical linkage as shown and described in the embodiments presented herein.

Thus, it will be appreciated from the foregoing that various modifications, substitutions, combinations and changes may be made in the embodiments which I have presented herein without departing from the true scope and spirit of my invention as defined in the appended claims.

What I claim as new and desire to secure by Letters Patent is:

1. In a control system for a fluid turbine, a turbine, means for controlling the fluid pressure at the inlet to said turbine in response to a speed error signal for regulating the speed of said turbine at a preselected level, means for producing a signal in response to variations in the fluid inlet pressure to said turbine downstream of said fluid pressure control means, and means for subtracting said pressure responsive signal from said speed error signal to stabilize the operation of said control system, said pressure responsive signal being the sole stabilizing signal in said system.

2. A speed control system for a fluid turbine comprising a turbine, a speed governor for producing a speed error signal in response to variations in the speed of the turbine from a preselected level, valve means for controlling the magnitude of the fluid pressure at the inlet to the turbine, means for producing a signal in response to variations in the fluid pressure downstream of said valve means and upstream of said turbine, means for subtracting said pressure responsive signal from said speed error signal to provide a net corrective signal for said control system, and means interconnecting said net corrective signal producing means and said valve means to position said valve means and control the fluid pressure at said turbine inlet solely as a function of said net corrective signal, whereby said pressure responsive signal acts as the sole stabilizing signal in said system.

3. A speed control system as set forth in claim 2 including means for washing out the steady state component of said pressure responsive signal.

4. A speed control system for a fluid turbine comprising a turbine, a speed governor for producing a mechanical speed error signal in response to variations in the speed of the turbine from a preselected level, valve means for controlling the magnitude of the fluid pressure at the inlet to the turbine, a variable volume chamber connected to respond to variations in the fluid inlet pressure to the turbine and to produce a mechanical output signal proportional to the magnitude of said turbine inlet pressure variations, linkage means interconnecting said speed governor and said variable volume chamber and producing a mechanical output signal proportional to the difference in magnitudes of the signals produced by said speed governor and said variable volume chamber, and means interconnecting said linkage means and said valve means to position said valve means solely as a function of the magnitude of said linkage output signal, whereby the signal produced by said variable volume chamber acts as the sole stabilizing signal in said system.

5. A speed control system as set forth in claim 4 including a second variable volume chamber connected to respond to the magnitude of the turbine inlet pressure and to produce a mechanical movement of said linkage means opposite in direction to that produced by the first variable volume chamber, and time delay means producing a time lag in the response of said second variable volume chamber.

6. A speed control system for a fluid turbine comprising a turbine, a speed governor for producing a speed error signal in response to variations in the speed of said turbine from a preselected level, valve means for controlling the magnitude of the fluid pressure at the inlet to said turbine, means for producing a signal in response to variations in the fluid pressure downstream of said valve means and upstream of said turbine, said pressure responsive signal producing means including a pressure transducer connected to respond to variations in turbine inlet pressure and to produce an electrical output signal proportional thereto, means for subtracting said pressure responsive signal from said speed error signal to provide a net corrective signal for said control system, and means interconnecting said net corrective signal producing means and said valve means to position said valve means and control the fluid pressure at said turbine inlet solely as a function of said net corrective signal, whereby said pressure responsive signal acts as the sole stabilizing signal in said system.

7. A speed control system as set forth in claim 6 including a capacitor electrically connected in series with said pressure responsive signal to wash out the steady state component thereof.

References Cited in the file of this patent

UNITED STATES PATENTS

| | | |
|---|---|---|
| 1,063,547 | Kieser | June 3, 1913 |
| 2,630,814 | Daniel | Mar. 10, 1953 |
| 2,823,685 | Anderson | Feb. 18, 1958 |